United States Patent [19]
Benton et al.

[11] Patent Number: 4,603,185
[45] Date of Patent: * Jul. 29, 1986

[54] CATALYTIC PROCESS FOR THE POLYMERIZATION OF ACETYLENE

[75] Inventors: Kenneth C. Benton, Macedonia; R. J. Weinert, Jr., Garfield Heights; Michael J. Desmond, Cleveland Heights, all of Ohio

[73] Assignee: The Standard Oil Company, Cleveland, Ohio

[*] Notice: The portion of the term of this patent subsequent to Nov. 13, 2001 has been disclaimed.

[21] Appl. No.: 565,430

[22] Filed: Dec. 27, 1983

[51] Int. Cl.$^4$ .................... C08F 4/44; C08F 38/00; C08F 38/02
[52] U.S. Cl. .................. 526/161; 526/139; 526/140; 526/141; 526/142; 526/285
[58] Field of Search ............ 526/161, 140, 141, 142, 526/285, 139; 260/144

[56] References Cited

U.S. PATENT DOCUMENTS

| | | | |
|---|---|---|---|
| 3,678,022 | 7/1972 | Bozik et al. | 526/141 |
| 3,883,570 | 5/1975 | Trofimenko | 526/285 X |
| 4,169,092 | 9/1979 | Bayer | 526/141 |
| 4,271,033 | 6/1981 | Gray et al. | 549/533 X |
| 4,452,914 | 6/1984 | Coleman, III et al. | 526/141 |
| 4,452,959 | 6/1984 | Kobayashi et al. | 526/285 |

OTHER PUBLICATIONS

R. S. Drago, M. J. Desmond, B. B. Corden and K. A. Miller, "*J. Am. Chem. Soc.*", vol. 105, pp. 2287–2296 (1983).

P. L. Watson and R. G. Bergman, "J. Am. Chem. Soc.", vol. 102 (8), pp. 2698–2703 (1980).

Primary Examiner—Joseph L. Schofer
Assistant Examiner—F. M. Teskin
Attorney, Agent, or Firm—David P. Yusko; Joseph G. Curatolo; Larry W. Evans

[57] ABSTRACT

Acetylene and other 1-alkynes are polymerized by a catalyst system comprised of a transition metal complex consisting of at least one binucleating ligand attached to at least one transition metal containing nucleus; and at least one organometallic cocatalyst containing at least one element of Group 1a, 2a or Group 3a.

40 Claims, No Drawings

CATALYTIC PROCESS FOR THE POLYMERIZATION OF ACETYLENE

BACKGROUND OF THE INVENTION

1. Field of the Invention

This invention relates to a process for the polymerization of 1-alkynes. More specifically, this invention relates to a process employing a two component catalyst system for the polymerization of acetylene. The first component is a transition metal complex and the second component or co-catalyst is an organometallic compound containing an element from Group 1a, 2a or 3a.

2. Description of the Prior Art

Polyacetylene is a linear polymer of acetylene having alternative single and double bonds. It is electrically conductive and this property can be enhanced or inhibited by appropriate doping with electron acceptors (such as arsenic pentafluoride or a halogen) or with electron donors (such as lithium or sodium). Thus polyacetylene can be made to have a wide range of electrical conductivity. Uses for polyacetylene range from insulators to n- or p-type semiconductors, to strongly conductive forms. Polyacetylene can be made in the form of fibers and thin films. Though still in the experimental stage, these polymers have significant possibilities for industrial applications. Structurally, polyacetylene exists in two isomeric forms:

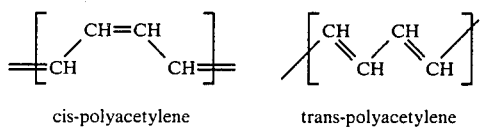

cis-polyacetylene     trans-polyacetylene

The polymerization of acetylene typically provides a mixture of both structures in the polymer backbone.

The conductivity of polyacetylene fibers increase with the degree of orientation. Increased orientation is therefore preferable. Since acetylene polymerizations yield a mixture of cis- and trans- structure in the polyacetylene backbone, there has been considerable experimentation in recent years in processes and catalysts, which will provide highly stereo specific polyacetylene.

In part the instant invention relates to a novel transition metal catalyst useful for the polymerization of acetylene. The use of transition metal catalysts for the polymerization of acetylene and 1-alkynes has long been known. Catalysts suitable for this type of polymerization were first described by G. Natta et al. in Italian Pat. No. 530,753 of July 15, 1955. Watson, McMordie and Lands, *Journal of Polymer Science*, Vol. 55, page 137, John Wiley and Sons, 1961, later described several catalysts useful for the polymerization of acetylene.

It is characteristic of these prior art catalysts that the structure of the resulting polyacetylenes varies with the reaction temperature and the co-catalyst to catalyst ratio, as well as with the particular transition metal catalyst selected. For example, it has been reported that a Ziegler-Natta catalyst of the formula $Ti/Al(C_2H_5)_3$, produces high cis-polyacetylene only at temperatures of 0° C. and below, while high trans-polyacetylene is produced at 100° C. and above, at an Al:Ti ratio of 4:1, Ita, Shirakawa and Ikeda, *Journal of Polymer Science - Polymer Chemistry Edition*, Volume 12, page 11, 1974.

It is an object of the instant invention to develop a novel catalyst and catalytic process for the polymerization of acetylene.

It is an object of the instant invention to develop a catalytic process which produces highly stereospecific at modest temperatures.

It is also an object of the instant invention to develop a catalytic process which will permit the control of the polymer microstructure so that high-cis or high-trans or intermediate structures of polyacetylene may be produced.

SUMMARY OF THE INVENTION

A process employing a novel catalyst system for the polymerization of 1-alkynes has been developed. This process comprises contacting, at a temperature and pressure sufficient to cause polymerization, a 1-alkyne with a catalyst system comprising a transition metal complex catalyst of at least one binucleating ligand which attaches to at least one nucleus which contains at least one transition metal, and a co-catalyst of at least one organometallic compound containing at least one element of Group 1a, Group 2a or Group 3a.

The catalysts employed in the instant process permit the control of the polymer microstructure so that high cis, high trans or intermediate structures may be produced by selectively varying the transition metal of the binuclear organometallic compound or the co-catalyst.

DETAILED DESCRIPTION OF THE INVENTION

The Alkynes

Alkynes are unsaturated hydrocarbons having a structural formula containing a carbon-carbon triple bond. Monomers suitable for the polymerization process of the instant invention are the 1-alkynes. Representative 1-alkynes are acetylene, propyne, 1-butyne, 1-pentyne, 1-hexyne, 1-heptyne, 1-octyne, 1-nonyne, 1-decyne, phenyl acetylene and diynes such as diethynylbenzene and 1,6 heptadiyne. The preferred monomer is acetylene.

The Catalyst System

The catalyst system consists of two components. The first component or catalyst is a transition metal complex of at least one ligand which attaches to at least one nucleus, but more commonly simultaneously attaches to two nuclei. The transition metals employed in this complex include those elements of Groups 1b through 7b and 8, of the Periodic Table of Elements, which will be subsequently referred to simply as transition metals. The second component or co-catalyst is at least one organometallic compound containing at least one element of Group 1a, Group 2a and Group 3a of the Periodic Table of Elements. The Periodic Table referred to herein is that appearing in the *Handbook of Chemistry and Physics*, 61st ed., Chemical Rubber Co. (1980).

The Catalyst

The transition metal complex catalyst contains at least one ligand. As here used, a ligand is a molecule, ion, or atom that is attached to the central atom or molecule of a coordination compound. A ligand which can attach to two central atoms or molecules is a binucleating ligand. A binucleating ligand is further defined to be a ligand which has the ability to bind in a multidentate fashion to two metal containing centers. The catalysts of the instant invention preferably utilize a binucleating ligand. However, where the nucleus, i.e. the central atom or molecule, is large, a single nucleus will satisfy the bonding requirements of the normally binucleating ligand.

The transition metal complex consists of a binucleating ligand attached to at least one nucleus, which contains at least one transition metal. Preferably the binucleating ligand simultaneously attaches to two nuclei. Preferably both nuclei contain at least one transition metal. It is not mandatory that both nuclei contain the same elemental components. Optionally the second nucleus may contain at least one metal from Group 1a, Group 2a and Group 3a of the Periodic Table. As here used and throughout the specification and claims, when a nucleus is said to "contain" an element or compound, then that nucleus is either that element or compound per se or the nucleus is a larger composition which includes that element or compound.

The transition metal complex of at least one binucleating ligand is a coordination compound. The bonding in a coordination compound is neither covalent nor electrostatic but is usually considered to be an intermediate between the two types. For purposes of this specification, a dotted line will be used in formulae and structures of transition metal complexes in order to show the locations of this coordination compound type bonding.

Preferred transition metal complexes of binucleating ligands are:

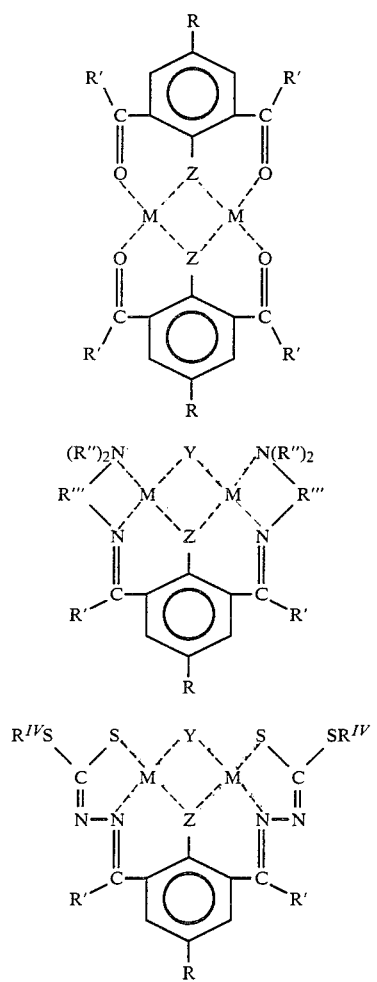
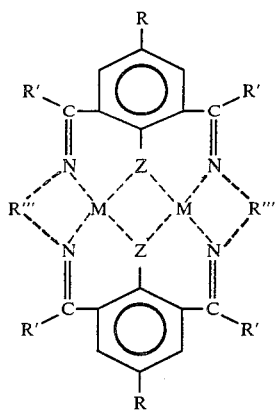
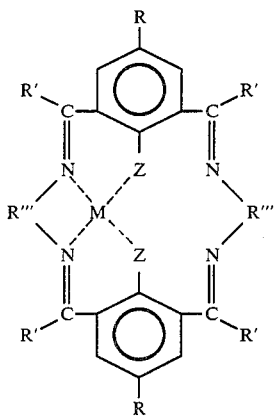
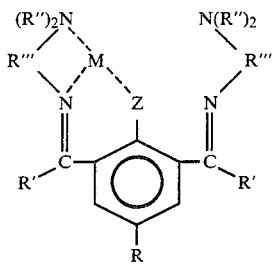
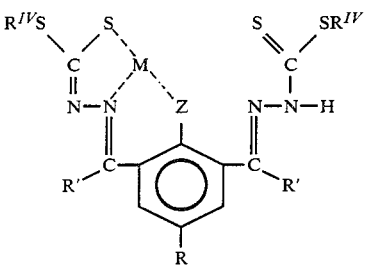

where each R and $R^{IV}$ are independently hydrogen or an aliphatic, cycloaliphatic or aromatic radical or an inertly substituted derivative of any one of these. Preferably each R and $R^{IV}$ are independently a $C_1$ to $C_{20}$ aliphatic radical, a $C_5$ to $C_7$ cycloaliphatic radical, phenyl radical or an inertly substituted derivative of any one of these. More preferably each R and $R^{IV}$ are a $C_1$ to $C_{12}$ alkyl radical.

Each R' and R'' are independently hydrogen or an aliphatic radical or an inertly substituted derivative thereof. Preferably each R' and R'' are independently hydrogen or a $C_1$ to $C_6$ aliphatic radical or an inertly substituted derivative thereof. More preferably each R' and R" are independently hydrogen or a $C_1$ to $C_6$ alkyl radical. Most preferably each R' and R" are hydrogen or a methyl radical.

Each R'" is independently an aliphatic, cycloaliphatic or aromatic radical or an inertly substituted derivative of any one of these. Preferably each R'" is independently a $C_1$ to $C_8$ aliphatic radical, a $C_5$ to $C_7$ cycloaliphatic radical, a phenyl radical or an inertly substituted derivative of any one of these.

Each M denotes a nucleus of the binucleating ligand. Each M contains at least one element of Group 1b-7b, Group 8, Group 1a, Group 2a and Group 3a of the Periodic Table with the proviso that at least one M contains an element of Group 1b-7b and Group 8, i.e. a transition metal.

Where M contains a transition metal, each M may be:

1. at least one transition metal. Preferred transition metals are vanadium, molybdenum, chromium and cobalt, copper nickel, and titanium. The more preferred transition metals are cobalt, copper, nickel and titanium.

2. a coordination compound containing at least one transition metal. A coordination compound is formed by the union of a metal ion with a nonmetallic ion or molecule called a ligand. A coordination compound may consist of one ligand or several ligands attached to a central atom or molecule called the nucleus. The transition metal is contained in the nucleus of the coordination compound. The ligands may be monodentate or multidentate. Suitable ligands include but are not limited to any alkoxide, azide, halide, sulfide, carboxylate, nitrate, sulfate, phosphate, perchlorate, amine, ether, thioether, phosphine, arsine, and oxime. Preferred coordination compounds are acetato cobalt and acetato chromium.

3. A compound containing at least one transition metal and at least one of oxygen, sulfur and selenium. Compounds containing a transition metal bonded to oxygen are preferred. Vanadium bonded to oxygen and titanium bonded to oxygen are more preferred.

Where M contains an element of Group 1a, Group 2a and Group 3a, preferred elements are hydrogen, beryllium, magnesium and calcium with magnesium more preferred.

In some embodiments, each M is the same transition metal, coordination compound or transition metal oxide, sulfide or selenide. In a preferred embodiment, one M contains a transition metal, e.g. cobalt, and the other M contains a coordination compound, e.g. acetato cobalt. In another preferred embodiment, one M contains vanadyl, chemical formula: o(V=O) or titanyl, chemical formula: (Ti=O) and the other M contains either cobalt or acetato cobalt. In another embodiment, one M contains a transition metal and the other M contains a nontransition metal from Groups 1a, 2a or 3a.

Y is any coordinating anion. Suitable coordinating anions are at least one of any alkoxide, halide, azide, hydroxide, cyanide, isocyanide, pyrazolate, amide, imidazolate and hydrazide. Preferred coordinating anions are any alkoxide, halide, azide, hydroxide. Most preferred coordinating anions are ethoxy and chloride.

Z is one of oxygen or sulfur.

Typically the ligands and the resulting transition metal complexes shown in formulas I through VII are prepared by sequential displacement reactions in solution.

The Co-catalyst

The co-catalyst is an organometallic compound or combination of organometallic compounds containing at least one element of Group 1a, Group 2a and Group 3a. An organometallic compound is comprised of a metal attached directly to a carbon atom. The elements of Group 1a, Group 2a and Group 3a of the Periodic Table suitable for use in the co-catalyst are lithium, sodium, potassium, cesium, beryllium, magnesium, calcium, strontium, boron, aluminum and gallium. Preferred co-catalysts are at least one of di-sec-butylmagnesium, n-butylmagnesium chloride, aluminum triethyl and compounds of the formula:

$$(R^V)_n AlX_{(3-n)}$$

where $R^V$ is at least one of an aliphatic, cycloaliphatic or aromatic radical or an inertly substituted derivative of any one of these, X is a halide and n is less than or equal to 3, but greater than 0.

Preferably $R^V$ is at least one of a $C_1$ to $C_8$ aliphatic radical, a $C_5$ to $C_7$ cycloaliphatic radical or a phenyl radical. More preferably $R^V$ is at least one of an alkyl, aryl, arylalkyl, alkenyl or arylalkenyl radical or an inertly substituted derivative of any one of these. Most preferably $R^V$ is at least one of an ethyl, isopropyl, sec-butyl, isobutyl, cyclohexyl, phenyl, benzyl, 1-octenyl and 1-phenyl-1-heptenyl radical.

Preferably X is at least one of chlorine, bromine and iodine. More preferably X is chlorine.

The more preferred co-catalysts include ethylaluminum dichloride, ethylaluminum sesquichloride and diethylaluminum chloride and mixtures thereof. Ethylaluminum dichloride in combination with diethylaluminum chloride is the most preferred co-catalyst.

Organometallic compounds are frequent co-catalysts in catalyst systems and their preparation is known to those skilled in the art. These catalysts are readily synthesized and many are commercially available.

Typically the transition metal complex catalyst and the organometallic compound co-catalyst are mixed in an inert diluent. The mole ratio of the organometallic compound co-catalyst to the transition metal complex catalyst is between approximately 1:1 and 300:1, preferably between approximately 3:1 and 50:1.

Polymerization

Typically it is advantageous to polymerize the 1-alkyne in the presence of an aromatic, an aliphatic or a halogenated hydrocarbon solvent. Many of the transition metal complexes and organometallic complexes are soluble in such solvents. The catalyst system dissolved in a solvent leads to the greatest efficiency of use of the catalytic metal species.

In one embodiment, the transition metal complex and organometallic compound are first dissolved in a small quantity of solvent. This solution is then added to a larger quantity of an inert diluent to form a heterogenous suspension. An inert diluent is a diluting agent which does not react with the catalyst or the co-catalyst, and in which the catalyst is insoluble or partially soluble. The volume ratio of the solvent solution to the inert diluent is between 5:1 and 50:1. Suitable solvents are aromatic hydrocarbons, or inertly substituted derivative thereof, or a halogenated aliphatic hydrocarbon. Suitable inert diluents are aliphatic and alicyclic hydrocarbons. Preferred inert diluents are n-hexane, n-heptane, 2,2,4-trimethylpentane, and cyclohexane.

Typically the mole ratio of the 1-alkyne to catalyst is between 100:1 and $1 \times 10^6$:1. However, essentially any amount of catalyst is sufficient to support some polymerization. The 1-alkyne may be polymerized at any temperatures and pressures sufficient for polymerization. The polymerization may be conducted at pressures of approximately 0.10 to 0.90 atmospheres and temperatures of approximately $-70°$ C. to $150°$ C. The preferred conditions for polymerization are pressures of approximately 0.2 to 0.7 atmospheres and temperatures of approximately $25°$ C. to $100°$ C.

Specific Embodiments

The following examples and comparisons which describe the preparation and use of this catalyst system are provided in order to better illustrate the instant invention.

EXAMPLE I

Preparation of the Catalyst

Preparation of the Ligand 50 g sodium hydroxide were dissolved in approximately 1.2 liters of water, and 150 g of 4-tert-butylphenol were added to this solution. The mixture was stirred and gently heated until the phenol dissolved. The solution was then cooled to ambient temperature. Aqueous formaldehyde (175 ml, 37 percent) was added, and the solution was stirred for four to six days at ambient temperature. Concentrated hydrochloric acid (110 ml) was added, upon which a two-phase system forms. A yellow, oily organic phase was isolated and washed with three 500 ml portions of water. Chloroform (700 ml) and 500 ml of water were added to this organic oil and the mixture was stirred. The organic phase was isolated and dried over 100 g of anhydrous magnesium sulphate. Evaporation and cooling of the chloroform solution yielded a mixture of white crystals and oil. The addition of 50-100 ml of chloroform and filtration yielded a white crystalline product, 4-tert-butyl-2, 6-di(-hydroxymethyl) phenol.

The 4-tert-butyl-2,6-di(hydroxymethyl) phenol (94.6 g) was added to 300 ml of water containing 23 g of sodium hydroxide. Toluene sulfonylchloride (90 g) and 100 ml of benzene were also added. The system was stirred vigorously for two days, filtered, and the white solid product was washed with three 100 ml aliquots of benzene. A 50-70 percent yield of the tosylated diol was obtained.

The tosylated diol (102 g) was dissolved with heating and stirring in 400 ml of glacial acetic acid. The solution was heated nearly to boiling and 86.3 g of sodium dichromate monohydrate were added very slowly. Upon cooling, the dark green solution yielded a powdery solid. The product was separated from the chromous salt solution and washed with water and 3:1 water:ethanol. The product was then dissolved in boiling ethanol to form an approximately 20 wt./vol percent solution. About 10 vol percent water was added and the solution was cooled while stirring. The pale green crystals of the tosylated diformylphenol which form were recovered by filtration and washed with 1:1 ethanol:water.

The tosylated diformyl compound (30 g) was then dissolved in 35 ml of concentrated sulfuric acid and stirred for at least 30 minutes. The solution was then poured slowly into a 800 ml beaker containing 600 ml of crushed ice. The pink-brown solid which formed was stirred in the ice-water mixture for at least two hours, then recovered by filtration, washed with water, and dried on the filter. The solid was extracted with mixed hexanes, using approximately one liter of hexane per 10 g of solid, until only a purple-red tar remained. The hexane solution was then evaporated to yield the yellow solid, 4-tert-butyl-6-formylsalicylaldehyde. The overall yield was generally of the order of 10-20 percent.

A solution of 34.2 g of potassium hydroxide in 190 ml of absolute ethanol and 20 ml of water was prepared. To this solution was added 34.8 g of 85 percent hydrazine hydrate. The solution was cooled in a sodium chloride-ice-water bath and stirred vigorously while adding dropwise over a two-hour period a solution of 36 ml of carbon disulfide in 39 ml of absolute ethanol, maintaining the reaction temperature at less than $3°$ C. Filtration of the reaction mixture yielded a white solid, potassium dithiocarbazate.

A solution of 26 g of potassium dithiocarbazate in 50 ml of 40 percent aqueous ethanol was prepared and 44 g of e-iodoheptane were added. The mixture was stirred at ambient temperature for two days. The reaction flask was wrapped in aluminum foil to prevent the photodecomposition of the heptyliodide. The solution was then cooled in an ice bath and quickly filtered to recoer the white solid, S-heptyldithiocarbazate. A yellow oil by-product was then removed by washing the white solid with ligroine. The product was then recrystallized from boiling hexane.

Solutions consisting of 8 g of the freshly-recrystallized S-heptyl-dithiocarbazate in 500 ml of 1:1 ethanol:-water and 4.00 g of 4-tert-butyl-6-formylsalicylaldehyde in 200 ml of ethanol were prepared. The two solutions were heated to boiling and quickly filtered. The two solutions were again heated to boiling, and the dialdehyde solution was added, with rapid agitation, to the S-heptyldithiocarbazate solution. A yellow precipitate formed almost immediately. The reaction mixture was allowed to boil for two minutes, then was cooled while stirring, and the yellow solid was isolated by filtration. The product, 4-tert-butyl-bis-2,6-N-(S-heptyl-dithiocarbamate)-formimidoyl-phenol, was washed with three 300 ml portions of 1:1 ethanol:water, followed by two 200 ml portions of 95 percent ethanol. This yellow crystalline solid is a ligand of the following structure:

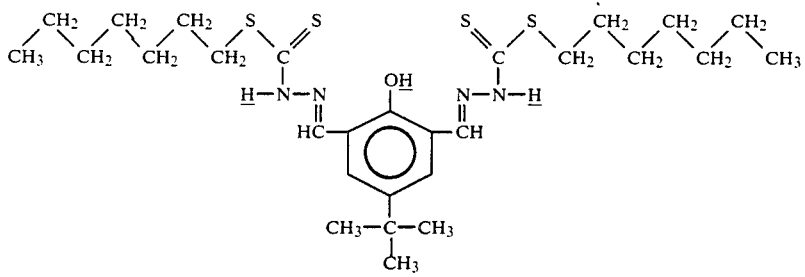

The above ligand will hereinafter be referred to as H₃(BNL). The BNL standing for binucleating ligand, and the H₃ standing for the 3 hydrogen atoms (underlined in the above structure) which are lost and the bonding altered when the binucleating ligand attaches to one or more nuclei.

EXAMPLE II

Preparation of Metal Complexes of the above Binucleating Ligand

The preparation of several binuclear metal complex catalysts from the binucleating ligand are described. In these examples (Me) is a methyl radical. (Et) is an ethyl radical and (Ac) is an acetyl radical. The structure of each of the catalyst produced was determined by infrared, NMR, ESR spectroscopy and elemental analysis. The formula weight of each catalyst was determined by elemental analysis, mass spectrometry and magnetic susceptibility.

EXAMPLE IIA

Preparation of $(VO)_2$ (BNL)(OEt)

Vanadyl acetate (389 mg) was combined with 583 mg of the ligand H₃(BNL) in 25 ml. of absolute ethanol. The mixture was stirred at ambient temperature for one to three weeks. The reaction mixture was filtered and the solid washed on the filter with ethanol and toluene. The unreacted vanadyl acetate remained on the filter. The filtrate and washings were combined and the solvent was removed on a rotary evaporator. An olive green solid was obtained in a 60–90 percent yield. This solid is a coordination compound of the following structure which has a formula weight of 758.88 g/mole.

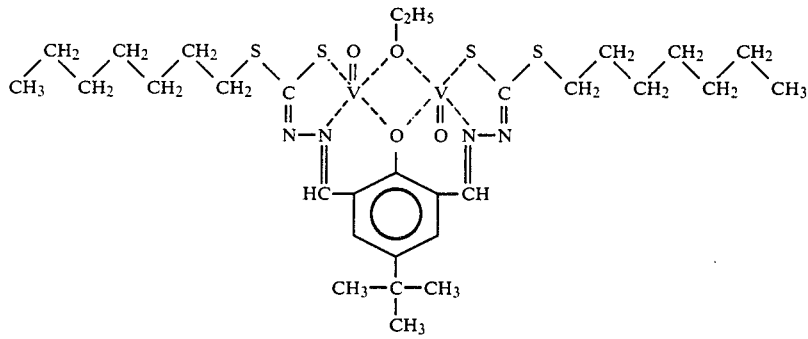

EXAMPLE IIB

Cu₂(BNL)(OEt)

The procedure of Example I was followed, except that 410 mg of cupric acetate monohydrate was used in place of the vanadyl acetate, the reaction time was two days and the solid was recovered as the desired product. This product Cu₂(BNL)(OEt) was obtained in an 80 percent yield.

EXAMPLE IIC

Co₂(BNL)(OEt)(OAc) toluene 520 mg of Co(acetate)₂4H₂O (2.1 mmoles) was dissolved in 20 ml of ethanol. To this solution was added 10 ml of 2,2-dimethyoxypropane (Aldrich). The solution turned from red to green in color. (This addition of a drying agent is optional.) 583 mg of H₃(BNL) (1.0 mmole) was dissolved in 10 ml of THF and combined with the Co solution. The solution was allowed to stir for 24 hours, followed by rotovapping to dryness. The solid residue was dissolved in 30 ml of 10:1 toluene:(2,2-dimethyoxypropane), or pure toluene, filtered and rotovapped to dryness. The residue was dissolved in 30 ml of toluene, filtered and upon slow evaporation produced a deep black crystalline solid. A yield of 60 percent for the above catalyst was determined. The formula weight for this catalyst was determined to be 896.06 g/mole.

General Polymerization and Polymer Characterization Procedure for Examples III through VI A 7-oz. crown cap bottle is washed, dried at 120° C. for at least 18 hours, and cooled in a dessicator. The catalyst complex, 10–30 mg, was dissolved in a minimal amount of dry toluene, 2–5 ml, and charged to the reaction bottle. The bottle was capped with a perforated crown cap and rubber septum. The bottle was then thoroughly purged with argon (approximately 20 min.) by inserting a 12 inch hypodermic needle through the cap and venting via a short hypodermic needle. The system was then allowed to equilibrate (10–20 min.) at the desired polymerization temperature. The co-catalyst, as a 25 wt. percent solution in n-heptane, was then injected into the bottle and the bottle was agitated by hand to distribute the catalyst solution over the walls of the bottle.

A polyethylene tube attached to a 12 inch hypodermic needle was connected to an acetylene cylinder and purged for several minutes. The needle was then inserted into the bottle which was vented through a mineral oil bubbler via a short hypodermic needle. The acetylene was allowed to flow through the reaction bottle at 3-10 psig for the desired reaction time. The excess acetylene was then purged from the bottle with argon.

The bottle was transferred to the glove box and opened. A small sample of the product, which was usually a gel-like material, was removed from the bottle, mixed with dry potassium bromide and pressed into a disc. The infrared spectrum was obtained, and the microstructure composition is calculated by the method of Ito, Shirakawa, and Ikeda *Journal Polymer Sci-Polymer Chemistry Edition*, Volume 12, page 11, 1974. This analysis was based on the carbon-hydrogen out-of-plane deformation bands at 1015 cm$^{-1}$ for trans-polyacetylene and 740 cm$^{-1}$ for cis-polyacetylene. The precision of the analysis was estimated to be ±5 percent.

EXAMPLE III

Preparation of cis-Polyacetylene

The polymerization procedure as described was employed with the following specific details: A 1:1 volume ratio of 25 weight percent ethylaluminum dichloride in heptane and 25 wt. percent triethyl aluminum was employed as the cocatalyst. The polymerizations were run for 20 min. at 40° C. The solvent was toluene (5 ml). The specific catalyst systems and the results are summarized in Table I. It is seen that high cis-polyacetylene is obtained at 40° C. using the catalysts of our invention, whereas the conventional catalyst produces a high trans-polyacetylene under similar conditions.

EXAMPLE IV

Preparation of trans-Polyacetylene

The polymerization procedure as described was followed, except that in the case of the titanium catalysts no solvent was added beyond that which accompanied the co-catalyst. The results are summarized in Table II. It is seen that high trans-polyacetylenes can be obtained at 40° C. using the catalysts of this invention.

EXAMPLE V

Effect of Co-Catalyst on Selectivity of

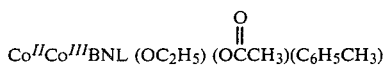

The polymerization procedure as described was followed. These examples (Table III) illustrate how the selectivity of the catalyst depends on the selection of the co-catalyst. It is seen that the polymerization selectivity can be altered at will from high-cis to high-trans by the use of the appropriate co-catalyst.

EXAMPLE VI

Effect of Co-Catalyst Ratio

The polymerization procedure as described was employed. The results (Table IV) show that high co-catalyst/catalyst ratios favor the formation of trans-polyacetylene. This effect is opposite to that reported by Shirakawa and co-workers for the case of the tetrabutyltitanate/triethylaluminum-catalyzed polymerization of acetylene.

TABLE I

| | | Preparation of Cis-Polyacetylene | | | |
|---|---|---|---|---|---|
| Example III | Catalyst | Co-Catalyst[2] | Al/M | Temp. °C. | % Cis |
| A | Co$^{II}$Co$^{III}$BNL(OC$_2$H$_5$)(OCCH$_3$)(C$_6$H$_5$CH$_3$) | 1:1 EADC/TEAl | 25 | 40 | 73 |
| B | Mo$_2$BNL(OC$_2$H$_5$)[1] | 1:1 EADC/TEAl | — | 40 | 64 |
| Prior Art[3] | Ti(OC$_4$H$_9$)$_4$ | TEAl | 4 | 50 | 32 |

[1]Approximate Structure
[2]EADC = Ethylaluminum Dichloride
TEAl = Triethylaluminum
[3]T. Ito, H. Shirakawa and S. Ikeda, J. Polymer Science - Polymer Chemistry Edition, Volume 12, Page 11, 1974.

TABLE II

| | | Preparation of Trans-Polyacetylene | | | |
|---|---|---|---|---|---|
| Example | Catalyst | Co-Catalyst[2] | Al/M | Temp. °C. | % Trans |
| IVA | (VO)$_2$ BNL(OC$_2$H$_5$) | TEAl | 15 | 40 | 76 |
| IVB | (TiO)$_2$ BNL(OC$_2$H$_5$)[2] | 1:1 EADC/TEAl | 10 | 40 | 85 |
| IVC | (Ni)$_2$ BNL(OC$_2$H$_5$) | TEAl | 25 | 40 | 80 |
| IVD | (Cu)$_2$ BNL(OC$_2$H$_5$) | TEAl | 40 | 40 | 89 |
| Prior Art | Ti(OC$_4$H$_9$)$_4$[3] | TEAl | 4 | 50 | 68[3] |

[1]EADC = Ethylaluminum Dichloride
TEAl = Triethyaluminum
[2]Approximate Composition
[3]Ito, Shirakawa, and Ikeda,

TABLE III

Effect of Co-Catalyst on Selectivity of

| Example V | Co-Catalyst[1] | Al/M | % Cis | % Trans |
|---|---|---|---|---|
| A | EADC/TEAl | 25 | 73 | 27 |
| B | EASC | 20 | 59 | 41 |
| C | EADC | 45 | 40 | 60 |
| D | TEAl | 45 | 19 | 81 |

[1]EADC = Ethylaluminum Dichloride
EASC = Ethylaluminum Sesquichloride
TEAl = Triethylaluminum

TABLE IV

Effect on Co-Catalyst/Catalyst Ratio on Selectivity of

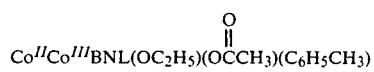

$Co^{II}Co^{III}BNL(OC_2H_5)(OCCH_3)(C_6H_5CH_3)$

| Example VI | Co-Catalyst | Al/M | % Cis | % Trans |
|---|---|---|---|---|
| A | Ethylaluminum Sesquichloride | 20 | 59 | 41 |
| B | Ethylaluminum Sesquichloride | 200 | 31 | 69 |

The claimed invention is:

1. A process for the polymerization of 1-alkynes comprising contacting the alkynes at a temperature and pressure between about −70° C. to about 150° C. and between about 0.10 to 0.90 atmospheres, respectively, with a catalyst system comprising:
    (a) at least one transition metal complex of at least one binucleating ligand, whcih attaches to at least one nucleus containing at least one transition metal element of Groups 1b through 7b and Group 8 of the Periodic Table of Elements, and
    (b) an organometallic compound containing at least one element of Group 1a, Group 2a, or Group 3a of the Periodic Table of Elements.

2. The process of claim 1 where the transition metal complex of (a) comprises at least one binucleating ligand which is attached to one or two nuclei and each nucleus independently contains at least one element of Groups 1b through 7b, Group 8, Group 1a, Group 2a and Group 3a of the Periodic Table of Elements with the proviso that there is at least one nucleus containing at least one element of Groups 1b through 7b and Group 8 in the complex.

3. The process of claim 2 where the transition metal complex of (a) is at least one of

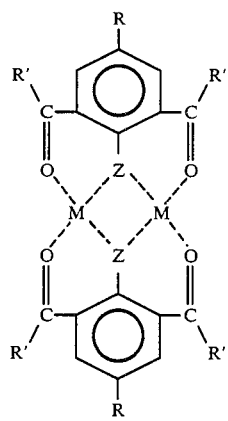
(a)

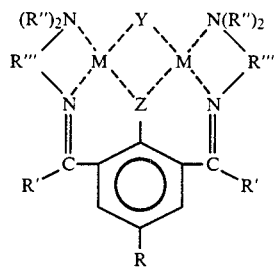
(b)

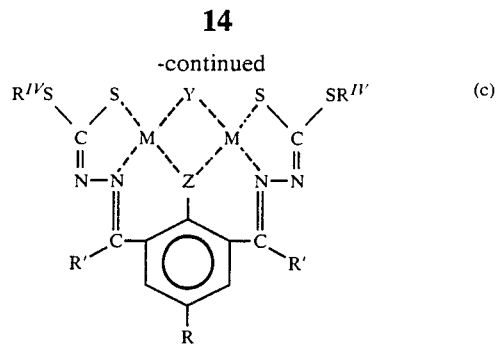
(c)

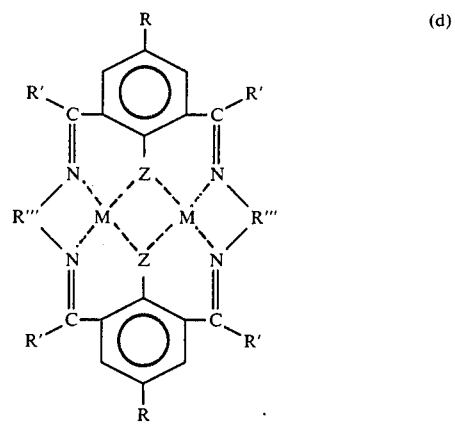
(d)

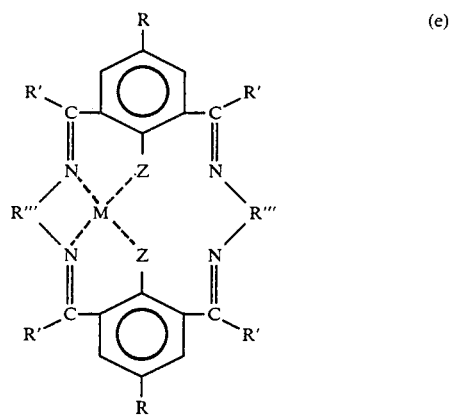
(e)

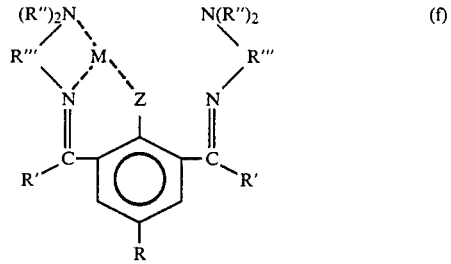
(f)

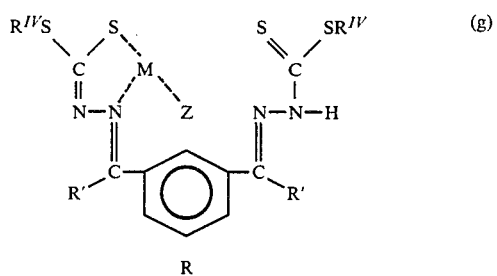
(g)

where each R and $R^{IV}$ are independently hydrogen, or an aliphatic, cycloaliphatic, or aromatic radical or an inertly substituted derivative of any one of these;

each R' and R" are independently hydrogen or an aliphatic radical or an inertly substituted derivative thereof;

each R''' is independently an aliphatic or aromatic radical or an inertly substituted derivative of any one of these;

each M contains at least one element of Groups 1b through 7b and Group 8, Group 1a, Group 2a and Group 3a of the Periodic Table of Elements with the proviso that at least one M contains at least one element of Groups 1b through 7b and Group 8;

Y is any coordinating anion; and

Z is one of oxygen and sulfur.

4. The process of claim 3 where each R and $R^{IV}$ are independently one of a $C_1$ to $C_{20}$ aliphatic radical, a $C_5$ to $C_7$ cycloaliphatic radical, a phenyl radical and an inertly substituted derivative of any one of these.

5. The process of claim 4 where each R and $R^{IV}$ are independently an alkyl radical of 1 to 12 carbon atoms.

6. The process of claim 3 where each R' and R" are independently one of hydrogen, an aliphatic radical of 1 to 6 carbon atoms and an inertly substituted derivative thereof.

7. The process of claim 6 where each R' and R" are independently one of hydrogen and a $C_1$ to $C_6$ alkyl radical.

8. The process of claim 7 where each R' and R" are independently one of hydrogen and a methyl radical.

9. The process of claim 3 where each R''' is independently one of a $C_1$ to $C_8$ aliphatic radical, a $C_5$ to $C_7$ cycloaliphatic radical, a phenyl radical or an inertly substituted derivative of any one of these.

10. The process of claim 3 where each M, which contains an element of Groups 1b through 7b and Group 8, is independently one of:

(a) at least one transition metal element of Atomic Number 22 through 30 and 40 through 48 of the Periodic Table of Elements;

(b) a coordination compound containing at least one transition metal element of Atomic Number 22 through 30 and 40 through 48 of the Periodic Table of Elements in its nucleus; and (c) at least one transition metal element of Atomic Number 22 through 30 and 40 through 48 of the Periodic Table of Elements combined with at least one of oxygen, sulfur and selenium.

11. The process of claim 10 where at least one M is independently one of cobalt, chromium, molybdenum, nickel, vanadium, copper and titanium.

12. The process of claim 10 where at least one M is independently at least one coordination compound comprised of at least one ligand of any alkoxide, azide, halide, sulfide, carboxylate, nitrate, sulfate, phosphate, amine, ether, thioether, phosphine, arsine, and oxime and containing at least one transition metal element of Atomic Number 22 through 30 and 40 through 48 of the Periodic Table of Elements.

13. The process of claim 12 where at least one M is independently one of acetato cobalt and acetato chromium.

14. The process of claim 10 where at least one M is independently at least one transition metal element of Groups 3b through 7b bonded to oxygen.

15. The process of claim 10 where at least one M is independently vanadium bonded to oxygen or titanium bonded to oxygen.

16. The process of claim 3 where one M contains at least one transition metal element of Groups 1b through 7b and Group 8 and the other M is at least one of hydrogen, beryllium, magnesium and calcium.

17. The process of claim 16 were one M contains at least one transition metal of Groups 1b through 7b and Group 8 and the other M is hydrogen.

18. The process of claim 17 where the one transition metal is molybdenum.

19. The process of claim 16 where one M contains at least one transition metal of Groups 1b through 7b and Group 8 and the other M is magnesium.

20. The process of claim 3 where Y is at least one of any alkoxide, halide, azide, hydrazide, hydroxide, cyanide, isocyanide, pyrozolate, amide and imidazolate.

21. The process of claim 20 where Y is one of ethoxy and chloride.

22. The process of claim 3, where the transition metal complex is of the following structure:

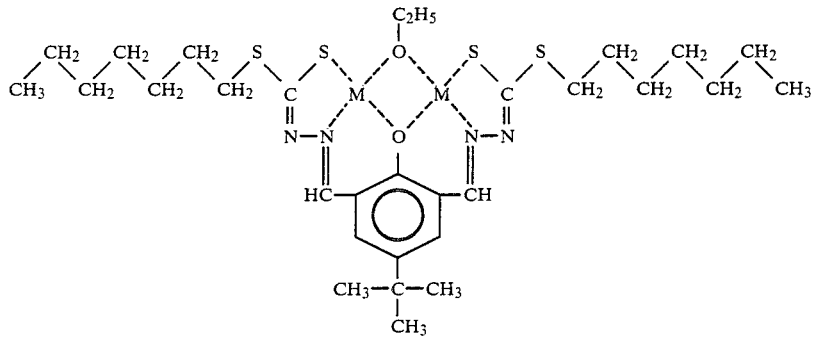

where each M is independently one of acetato chromium, acetato cobalt, cobalt, vanadyl, titanyl, nickel, or copper.

23. The process of claim 22, where each M is acetato cobalt, titanyl, nickel or copper.

24. The process of claim 22, where one M is cobalt and the remaining M is acetato cobalt.

25. The process of claim 22, where each M is cobalt.

26. The process of claim 22, where each M is acetato chromium.

27. The process of claim 22, where each M is vanadyl.

28. The process of claim 3, where the transition metal complex is of the following structure:

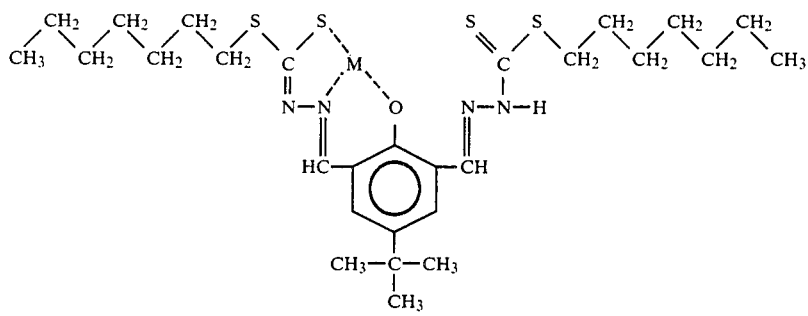

where M is molybdenum.

29. The process of claim 1 where the organometallic compound of (b) contains at least one of lithium, sodium, potassium, cesium, beryllium, magnesium, calcium, strontium, boron, aluminum, and gallium.

30. The process of claim 29 where the organometallic compound is at least one of:
 (a) di-sec-butylmagnesium;
 (b) n-butylmagnesium chloride;
 (c) aluminum triethyl and
 (d) compounds of the formula: $(R^V)_n AlX_{(3-n)}$
 where $R^V$ is at least one of an aliphatic, cycloaliphatic and aromatic radical of 1 to 8 carbon atoms,
 X is a halide and
 n is less than or equal to 3 but greater than 0.

31. The process of claim 29 where $R^V$, in the organometallic compound of formula $(R^V)_n AlX_{(3-n)}$, is at least one of an alkyl, aryl, arylalkyl, alkenyl and arylalkenyl radical.

32. The process of claim 30 where $R^V$ is at least one of an ethyl, isopropyl, sec-butyl, isobutyl, cyclohexyl, phenyl, benzyl, 1-octenyl and 1-phenyl-1-heptenyl radical.

33. The process of claim 29 where X, in the organometallic compound of the formula $(R^V)_n AlX_{(3-n)}$ is at least one of chlorine, bromine and iodine.

34. The process of claim 29 where X is chlorine.

35. The process of claim 29 where the organometallic compound of the formula $(R^V)_n AlX_{(3-n)}$ is at least one of ethylaluminum dichloride, ethylaluminum sesquichloride and diethylaluminum chloride.

36. The process of claim 29 where the organometallic compound is a combination of ethyl aluminum dichloride and diethylaluminum chloride.

37. The process of claim 1 where the mole ratio of the organometallic compound to the transition metal complex is between approximately 1:1 and 300:1.

38. The process of claim 37 where the ratio of the organometallic compound to the transition metal complex is between approximately 3:1 and 50:1.

39. The process of claim 1 where the 1-alkyne is at least one of acetylene, propyne, 1-butyne, 1-pentyne, 1-hexyne, 1-heptyne, 1-octyne, 1-nonyne, 1-decyne, phenyl acetylene, diethynylbenzene and 1,6-heptadiyne.

40. The process of claim 1 where the 1-alkyne is acetylene.

* * * * *